US010071716B2

(12) United States Patent
Schlosser et al.

(10) Patent No.: US 10,071,716 B2
(45) Date of Patent: Sep. 11, 2018

(54) HYDRAULIC SYSTEM FOR A HYDRODYNAMIC MACHINE

(71) Applicant: Voith Patent GmbH, Heidenheim (DE)

(72) Inventors: Markus Schlosser, Ellwangen (DE); Matthias Rommel, Schwäbisch Gmünd (DE); Helmut Ott, Insingen (DE); Thorsten Lührs, Kirchberg (DE)

(73) Assignee: Voith Patent GmbH, Heidenheim (DE)

( * ) Notice: Subject to any disclaimer, the term of this patent is extended or adjusted under 35 U.S.C. 154(b) by 240 days.

(21) Appl. No.: 15/083,959

(22) Filed: Mar. 29, 2016

(65) Prior Publication Data

US 2016/0244041 A1    Aug. 25, 2016

Related U.S. Application Data

(63) Continuation of application No. PCT/EP2014/070590, filed on Sep. 26, 2014.

(30) Foreign Application Priority Data

Sep. 30, 2013    (DE) .......................... 10 2013 219 792

(51) Int. Cl.
| F16D 33/06 | (2006.01) |
| B60T 10/02 | (2006.01) |
| F16D 57/02 | (2006.01) |
| F16H 41/30 | (2006.01) |
| F16D 57/04 | (2006.01) |

(52) U.S. Cl.
CPC .............. B60T 10/02 (2013.01); F16D 57/02 (2013.01); F16D 57/04 (2013.01); F16H 41/30 (2013.01)

(58) Field of Classification Search
CPC .......... F16D 57/02; F16D 57/04; F16H 41/30; B60T 10/02
USPC ............................................ 60/337; 188/296
See application file for complete search history.

(56) References Cited

U.S. PATENT DOCUMENTS 2,496,497 A * 2/1950 Russell ................... F16D 57/04
188/296
6,817,455 B1 * 11/2004 Gazyakan ............... F16D 57/04
188/290

FOREIGN PATENT DOCUMENTS

| CN | 101448690 A | 6/2009 |
| CN | 103101522 A | 5/2013 |
| DE | 27 57 237 A1 | 6/1979 |

(Continued)

OTHER PUBLICATIONS

Chinese Office Action dated May 26, 2017 for Chinese Application No. 201480053992.2 (8 pages).

(Continued)

*Primary Examiner* — Michael Leslie
(74) *Attorney, Agent, or Firm* — Taylor IP, P.C.

(57) ABSTRACT

A hydrodynamic machine for producing a braking torque, the hydrodynamic machine comprising: a toroidal working chamber including a first bladed wheel and a second bladed wheel arranged concentrically with the first bladed wheel; and a hydraulic system including an open loop and closed loop control unit, a working medium accumulator, a line system, a pump operable to produce a volume flow circulation of a working medium through the line system and the toroidal working chamber, a heat exchanger, and a pressure control valve operable to control or adjust the baking performance or the braking torque.

14 Claims, 2 Drawing Sheets

(56) References Cited

FOREIGN PATENT DOCUMENTS

DE          199 09 690 A1    9/2000
DE   10 2006 030 791 A1    1/2008

OTHER PUBLICATIONS

Notice of Transfer of International Research Report and the Written Notice Issued for International Searching Authority or Statement dated Mar. 31, 2015 for International Application No. PCT/EP2014/070590 (9 pages).

* cited by examiner

HYDRAULIC SYSTEM FOR A HYDRODYNAMIC MACHINE

CROSS REFERENCE TO RELATED APPLICATIONS

This is a continuation of PCT application No. PCT/EP2014/070590, entitled "HYDRAULIC SYSTEM FOR A HYDRODYNAMIC MACHINE", filed Sep. 26, 2014, which is incorporated herein by reference.

BACKGROUND OF THE INVENTION

1. Field of the Invention

The invention relates to a hydrodynamic machine, in particular a hydrodynamic retarder to produce a braking torque by way of a fluid.

2. Description of the Related Art

Hydrodynamic machines or hydrodynamic retarders generally include a housing in which a first bladed wheel, in particular a rotor and a second bladed wheel, in particular a stator arranged concentrically thereto which together form a toroidal chamber, and that are grouped about a common axis of rotation are arranged.

Retarders or hydrodynamic brakes can be arranged in a drive train on the motor side or respectively gear box side. The fill level of the retarder with a working fluid, for example oil or water with or without additives, determines the rotor "braking torque". When operating the retarder, oil for example is pumped into the working chamber. During braking operation, the driven rotor accelerates this oil and transfers it on the outside diameter of the working chamber to the stator. There, the oil is slowed and returned via the inside diameter of the working chamber back into the rotor. Due to the generally known interaction between rotor and stator the braking torque develops.

A hydraulic system ensures that in the non-braking operation and/or in the braking operation the working chamber is supplied or respectively filled with the appropriate working medium. It is thereby of special consideration that the heat that is generated in both operational modes is removed from the working chamber by way of the working medium and is returned for cooling to a cooling circuit in a cooler. It is particularly necessary in the non-braking operation that a minimum volume is routed through the working chamber in order to cool the retarder also in the non-braking operation.

The working chamber is connected to a working fluid circuit via the fluid supply and the fluid discharge, wherein said circuit consists essentially of a working fluid accumulator, a cooler, a pump and several valves. An open loop and closed loop control unit is connected with the components of a hydraulic system in such a manner that the braking torque and/or working medium flow can be controlled or respectively regulated.

A hydraulic system of this type is known for example from DE 10 2006 030 791 A1. In this hydraulic system the objective is essentially to direct the working medium in all operational modes through a cooler in order to achieve optimum temperature control. The working medium is an oil that at the same time is used for gear lubrication. For adaptation of the volume flow it is provided to control the pump of the hydraulic system.

It is the objective of the current invention to suggest an improved hydraulic system for a hydrodynamic machine. In particular, with the objective to improve the electro-hydraulic system in regard to the adjustability of the braking performance.

SUMMARY OF THE INVENTION

The invention includes a hydrodynamic machine or a retarder, in particular a hydrodynamic retarder, comprising a first bladed wheel, in particular a rotor and a second bladed wheel arranged concentrically thereto, in particular a stator that together form a toroidal working chamber. The hydrodynamic machine moreover includes an electrohydraulic system including an open loop and closed loop control unit, a pump, a heat exchanger, a working medium accumulator, a valve and a line system, wherein a volume flow circulation of the working medium can be generated by the pump through the line system and the working chamber. The electrohydraulic system is characterized in that the valve is a pressure control valve by means of which the braking performance or respectively the braking torque can be controlled/adjusted.

By using a pressure control valve, the system pressure can be advantageously controlled proportionally to the torque or respectively braking torque. The pressure control valve may be a 3/3 directional valve or a 3/2 directional valve.

The electrohydraulic system for control/adjustment of the pressure control valve can moreover include a pressure differential control. In the sense of the invention, the pressure differential control comprises at least one proportional valve and the open loop and closed loop control unit.

In addition, a sensor can be coupled for torque measurement with the open loop and closed loop control unit so that torque measurement values can also be used for the pressure differential control.

The pump is moreover integrated into the hydraulic system in such a manner that the pump can be switched in two operational states: a first operational state, the non-braking state; and a second operational state, the braking state; wherein the line system is designed in such a manner that a volume flow circulation can be pumped through the working chamber in both operational states.

By using a pump in combination with a switching valve in order to secure supply of the working chamber with working medium in all operational situations, the complexity of the line system or respectively the hydraulic system can be reduced. This results in reduced hydraulic resistances, as well as advantages in regard to system safety, maintenance and economic efficiency.

The pump can be a Gerotor pump that is coupled or non-rotatably connected with the rotor.

In a first embodiment, the switching valve for switching of the operational state can moreover be located at the pressure side of the pump, wherein a bypass line is provided for bypassing the switching valve and the pump, back into the working medium accumulator is provided. In this arrangement the substantial control of the working medium volume occurs on the pressure side of the pump, in particular through the downstream hydraulic- or line system. Non-essential working medium is returned into the working medium accumulator before and/or after the valve.

In a second embodiment, the switching valve for switching of the operational state can be arranged on the suction side of the pump, whereby in this arrangement a bypass line is provided to bypass the valve and through which the working medium can be sucked by the pump.

A second bypass line is provided, so that working medium or a partial volume flow can be pumped in the first operating state, the non-braking operation, into the working chamber also in this embodiment. A working medium filter can be provided in this bypass line.

In this design a proportional valve by way of which the first pressure control valve is controlled/adjusted can moreover be coupled advantageously after the working medium filter with the bypass line. This has two advantages. In the first instance, only a small amount of working medium needs to be filtered, thus considerably reducing the costs for the "filter" function. The proportional valve is moreover kept ready for operation at all times due to the coupling with the bypass line, since there is always a certain working medium pressure present.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 2:
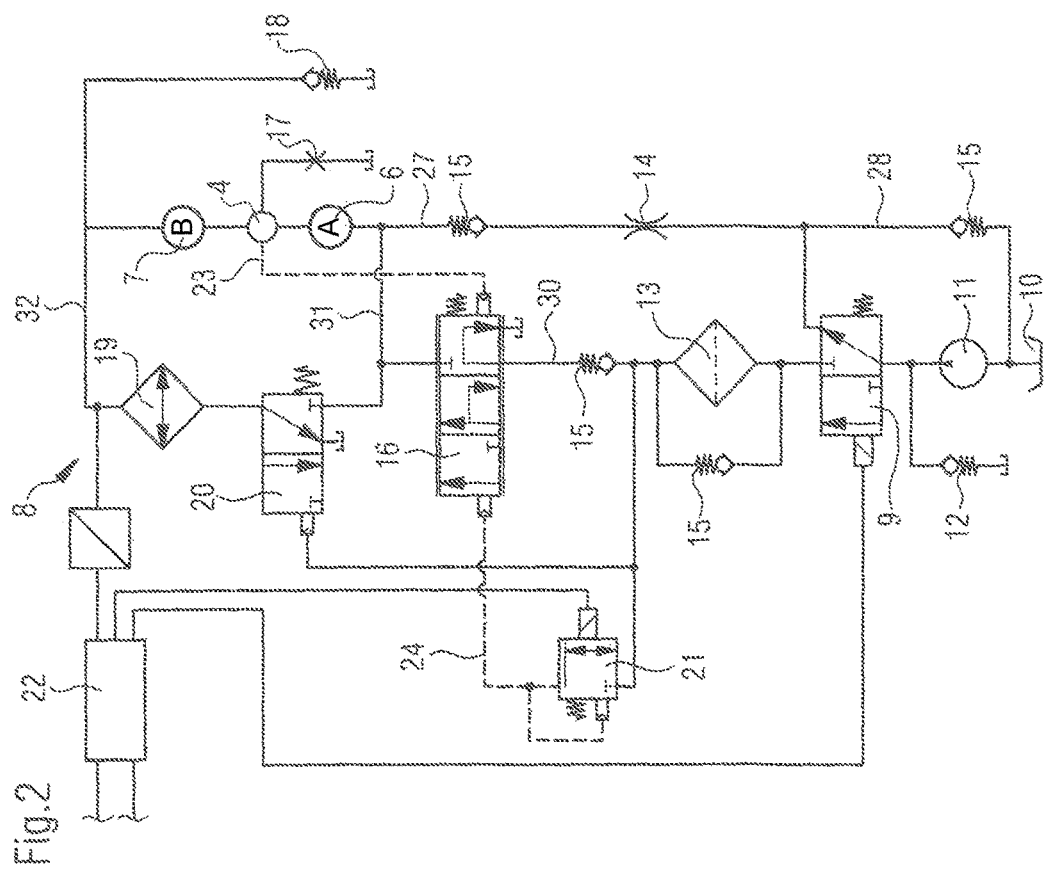
FIG. 2 illustrates a first embodiment for the design of a hydraulic system.
Figure 1:
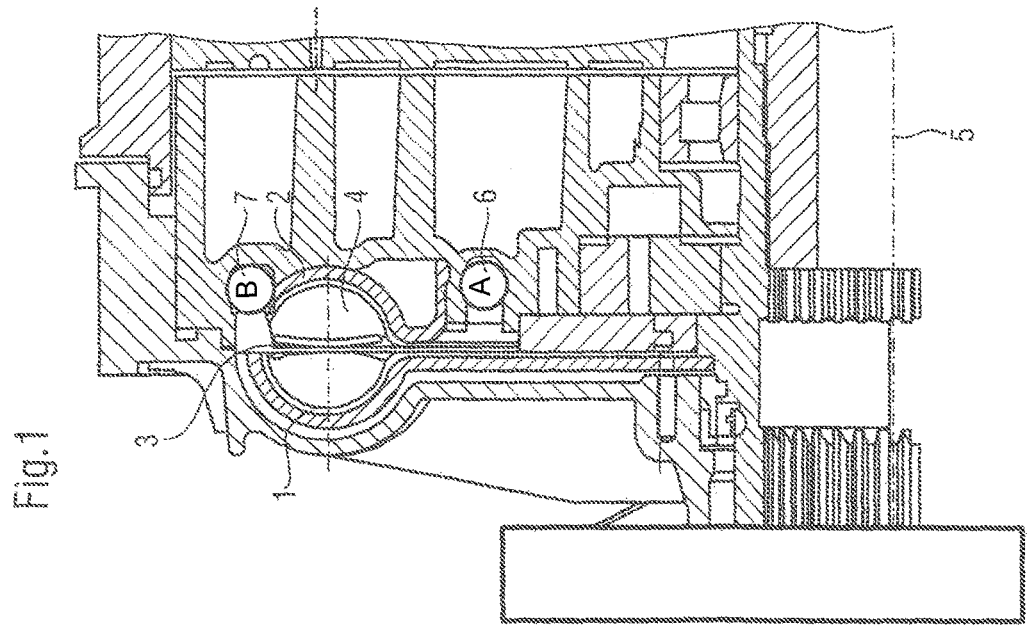
FIG. 1 illustrates a sectional view of a retarder according to the invention.

With additional reference to FIG. 2, FIG. 1 is a sectional view of an exemplary retarder that is used in particular in buses and commercial vehicles. The retarder includes a housing consisting of several housing parts, a rotor 1 and a stator 2 that together form a toroidal annulus or working chamber 4.

The retarder is driven by a working medium, in particular an oil that is pumped by way of pump 11 via a line system into intake channel 6 or respectively spiral channel. From intake channel 6 the oil arrives through separating gap 3 into working chamber 4. During the braking operation, a circulatory flow forms in working chamber 4. Driven rotor 1 accelerates the oil and transfers it at the outside diameter into stator 2. There, the oil impacts on the stationary stator blades and is slowed down. On the inside diameter the oil flows again to rotor 2. The resulting braking energy is converted predominantly into heat, so that it is necessary to cool part of the oil permanently by way of a heat exchanger 19. This part of the oil is drained from the circulatory flow through the fluid outlet or outlet channel 7. The drained oil is then pumped through a heat exchanger 19 and subsequently—depending on the operational condition—back into working chamber 4, so that a circulatory flow is created. In non-braking operation the oil is pumped back into working medium accumulator 10.

FIG. 2, with continued reference to FIG. 1, illustrates a first embodiment for the design of the hydraulic system. A substantial characteristic of this design is the positioning of pump 11 before valve 9. The valve is herein illustrated in the non-braking operational position. As soon as the pump is driven, oil is pumped from the working medium accumulator 10 via the valve 9 into bypass lines 27, 28. A throttle 14 is installed in bypass line 27 that can be adjusted in such a manner that a small part of the working medium is pumped into working chamber 4. The volume flow is to be selected large enough that sufficient heat removal out of the working chamber is ensured. Moreover, it may not be so large as to create an increased no-load resistance. From working chamber 4, the oil is pumped through heat exchanger 19 back into working medium accumulator 10. Thus, a small amount of oil is continuously being cooled in the non-braking operation by way of heat exchanger 19.

Second bypass line 28 feeds the remaining, substantially larger volume flow directly back into working medium accumulator 10. Pump 11 thus runs virtually in a no-load mode as a result of which the losses in the non-braking operation can be minimized without having to adjust the pump 11. A Gerotor pump can hereby be used that is driven directly by the rotor shaft.

For the braking operation—position not indicated— valves 9, 16 and 20 are switched. As soon as switching valve 9 that is located on the pressure side of pump 11 switches, the working medium gets into working chamber 4 via working medium limes 30, 31 and valve 16.

Valve 16 is a pressure compensator that is switched into the appropriate switching position via the pressure measured in working chamber 4 and the pressure predefined by proportional valve 21. A pressure compensator is a differential pressure valve or a pressure control valve that can regulate a differential pressure between an externally fed measuring location and an actual pressure at the valve. Valve 16 can be designed as a 3/3 directional valve as illustrated herein, or also as a 2/3 directional valve. The system pressure in working chamber 4 can be regulated proportionally to the desired braking torque at the rotor shaft by way of the pressure compensator. A torque sensor can be provided for this purpose, for example on the rotor shaft. In this switching, proportional valve 21 is supplied with system pressure only when switching into the braking position. A filter 13 is provided for the protection of proportional valve 21 that filters the entire working medium necessary for the braking operation.

As a result of switching valve 20, a closed loop between working chamber 4 and cooler 19 is formed, wherein the system pressure is adjusted through control of the pressure compensator.

Figure 3:
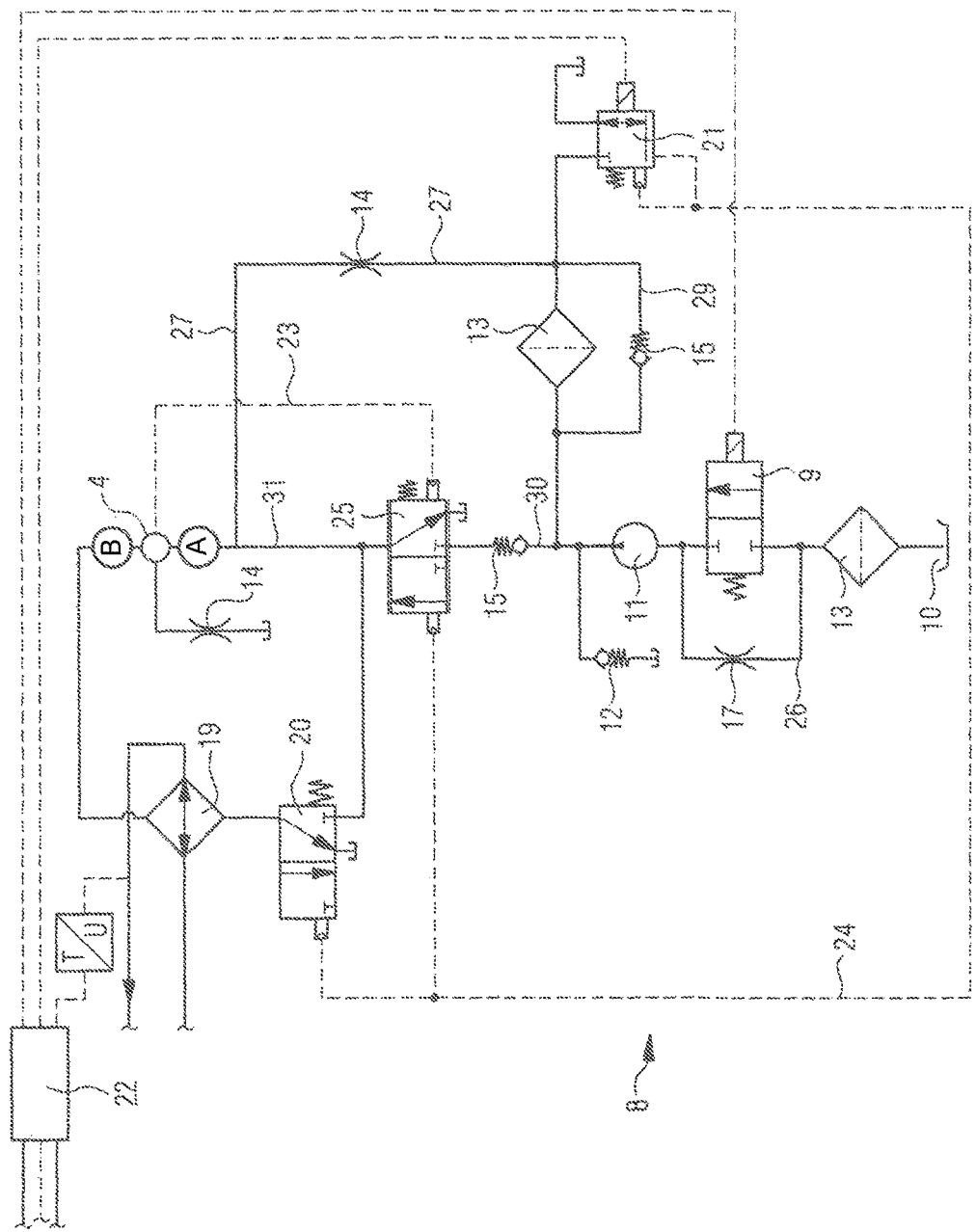
FIG. 3 illustrates a second embodiment for the design of a hydraulic system.

FIG. 3, with continued reference to FIG. 1, illustrates a second embodiment of the structure of the hydraulic system. This differs substantially from the first embodiment, wherein also in this embodiment in the non-braking operation, a certain volume of working medium is pumped into working chamber 4 by way of pump 11. In this design, valve 9 is located on the suction side of pump 11.

In the non-braking operation working medium is continuously sucked by pump 11 via bypass line 26 that is throttled by way of a suction throttle 17 from working medium accumulator 10, and is pumped via bypass 27 into working chamber 4. Bypass line 27 thereby ends in inlet channel 6 in such a way that the working medium is essentially pumped through working chamber 4 into outlet channel 7.

An additional throttle 14 is installed in bypass 27, and before the same, a proportional valve 21 is connected with valve 25 to bypass line 27 for control of the pressure compensator. In this way it is ensured that there is always sufficient system pressure available at proportional valve 21, and that therefore always a quick delay-free adjustment of the braking effect is facilitated. Moreover, a filter 13, in particular a fine filter is installed in bypass line 27 before proportional valve 21. As a result, only the relatively small volume that is necessary for the non-braking operation and for control of proportional valve 21 is filtered.

For the braking operation—position not illustrated—valves 9, 20 and 25 are switched. The oil gets into working chamber 4 via working lines 30, 31 and valve 25. Valve 25 is a pressure compensator that is switched into the appropriate switching position according to the pressure that is measured in working chamber 4 and the pressure that is predefined by proportional valve 21. Valve 25 can be designed as a 2/3 directional valve as indicated in this example, or alternatively as a 3/3 directional valve. By way of the pressure compensator the system pressure in working chamber 4 can be adjusted proportionally to the desired braking torque at the rotor shaft. For this purpose, a torque sensor may for example by provided on the rotor shaft.

A Gerotor pump 11 is provided as the pump and is connected non-rotatably with the rotor shaft. Both embodiments ensure that the pump resistance in the non-braking operation is very low and supports the braking action in the braking operation.

Generally, the filters and return lines into the working medium accumulator 10 illustrated in the drawings, and the throttles or check valves that are installed in the lines, are indeed necessary for the overall function but are routinely used by the expert.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST 1 rotor
2 stator
3 separation gap
4 working chamber
5 axis of rotation
6 inlet channel
7 outlet channel
8 electrohydraulic system
9 valve
10 working medium accumulator
11 pump
12 pressure relief valve
13 oil strainer/filter
14 throttle
15 check valve
16 pressure differential valve 3/3 directional valve
17 suction throttle
18 pressure relief valve
19 heat exchanger
20 switching valve
21 proportional valve
22 open loop and closed loop control unit
23 control line
24 control line
25 pressure differential valve
26-29 bypass line
30-31 working line
32 line to cooler

What is claimed is:

1. A hydrodynamic machine for producing a braking torque, the hydrodynamic machine comprising:
 a toroidal working chamber including:
  a first bladed wheel; and
  a second bladed wheel arranged concentrically with the first bladed wheel; and
 a hydraulic system including:
  an open loop and closed loop control unit;
  a working medium accumulator;
  a line system;
  a pump operable to produce a volume flow circulation of a working medium through the line system and the toroidal working chamber;
  a heat exchanger;
  a pressure control valve operable to control or adjust a braking performance or a braking torque; and
  a pressure differential control including the open loop and closed loop control unit, at least one proportional valve operably connected to the open and closed loop control unit and to the pressure control valve, and a control line fluidly connecting the working chamber and the pressure control valve, wherein the pressure control valve is controlled or adjusted by said pressure differential control.

2. The hydrodynamic machine according to claim 1, wherein the hydrodynamic machine is a hydrodynamic retarder.

3. The hydrodynamic machine according to claim 1, wherein the first bladed wheel is a rotor and the second bladed wheel is a stator.

4. The hydrodynamic machine according to claim 3, wherein the pump is a Gerotor pump that is coupled with the rotor.

5. The hydrodynamic machine according to claim 1, wherein the pressure control valve is a 3/3 directional valve or a 3/2 directional valve.

6. The hydrodynamic machine according to claim 1, wherein the pump is integrated into the hydraulic system in such a manner that it can be switched into a first operational state and a second operational state, and the line system is operable to allow the pump to pump a volume flow circulation through the working chamber in both the first operational state and the second operational state.

7. The hydrodynamic machine according to claim 6, wherein the first operational state is a non-braking state and the second operational state is a braking state.

8. The hydrodynamic machine according to claim 6, wherein a valve for switching of the operational state is arranged on a pressure side of the pump, and a bypass line is provided for bypassing the valve and the pump back into the working medium accumulator.

9. The hydrodynamic machine according to claim 6, wherein a valve for switching of the operational state is arranged on a suction side of the pump, and a bypass line is provided to bypass the valve.

10. The hydrodynamic machine according to claim 6, wherein a second bypass line is provided through which a partial volume flow is operable to be pumped in the first operational state into the toroidal working chamber.

11. The hydrodynamic machine according to claim 10, wherein a working medium filter is provided in the second bypass line.

12. The hydrodynamic machine according to claim 11, wherein the pressure control valve is controlled or adjusted by way of a proportional valve that is coupled after the working medium filter with the second bypass line.

13. A hydrodynamic machine for producing a braking torque, the hydrodynamic machine comprising:
- a toroidal working chamber including:
  - a first bladed wheel; and
  - a second bladed wheel arranged concentrically with the first bladed wheel; and
- a hydraulic system including:
  - an open loop and closed loop control unit;
  - a working medium accumulator;
  - a line system;
  - a pump operable to produce a volume flow circulation of a working medium through the line system and the toroidal working chamber;
  - a heat exchanger; and
  - a pressure control valve operable to control or adjust a braking performance or a braking torque, wherein the pressure control valve is controlled or adjusted by a pressure differential control, and a sensor is coupled for torque measurement with the open loop and closed loop control unit, and the torque measurement values are used for the pressure differential control.

14. A hydrodynamic machine for producing a braking torque, the hydrodynamic machine comprising:
- a toroidal working chamber including:
  - a first bladed wheel; and
  - a second bladed wheel arranged concentrically with the first bladed wheel; and
- a hydraulic system including:
  - an open loop and closed loop control unit;
  - a working medium accumulator;
  - a line system;
  - a pump operable to produce a volume flow circulation of a working medium through the line system and the toroidal working chamber, said pump is integrated into the hydraulic system in such a manner that it can be switched into a first operational state and a second operational state, and the line system is operable to allow the pump to pump a volume flow circulation through the working chamber in both the first operational state and the second operational state;
  - a heat exchanger;
  - a pressure control valve operable to control or adjust a braking performance or a braking torque; and
  - a bypass line through which a partial volume flow is operable to be pumped in the first operational state into the toroidal working chamber, and said bypass line includes a working medium filter, and wherein the pressure control valve is controlled or adjusted by a proportional valve that is coupled after the working medium filter with the bypass line.

* * * * *